US006954521B2

(12) United States Patent
Bull et al.

(10) Patent No.: US 6,954,521 B2
(45) Date of Patent: Oct. 11, 2005

(54) METHOD AND SYSTEM FOR PROVIDING ENHANCED CALL WAITING AND CALLER IDENTIFICATION

(75) Inventors: Rex Norman Bull, St. Charles, IL (US); James Thomas Maciejewski, Spring Grove, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

(21) Appl. No.: 10/272,662

(22) Filed: Oct. 17, 2002

(65) Prior Publication Data

US 2003/0035526 A1 Feb. 20, 2003

Related U.S. Application Data

(63) Continuation of application No. 09/265,001, filed on Mar. 9, 1999, now Pat. No. 6,498,841, which is a continuation-in-part of application No. 09/122,484, filed on Jul. 24, 1998, and application No. 09/044,574, filed on Mar. 19, 1998, now Pat. No. 6,219,414.

(51) Int. Cl.[7] .......................... H04M 1/64; H04M 3/42; H04M 1/56

(52) U.S. Cl. ............................. 379/142.08; 379/88.19; 379/88.2; 379/88.21; 379/215.01

(58) Field of Search ........................... 379/88.21, 88.18, 379/88.19, 88.13, 88.14, 215.01, 211.01, 207.16, 207.15, 207.14, 207.13, 207.07, 207.04, 201.07, 201.01, 142.14, 93.15, 88.22, 88.23, 88.2, 142.01, 142.02, 142.04, 142.08, 205.01

(56) References Cited

U.S. PATENT DOCUMENTS 5,533,106 A * 7/1996 Blumhardt ............. 379/142.02

* cited by examiner

*Primary Examiner*—Rexford Barnie
(74) *Attorney, Agent, or Firm*—Brinks Hofer Gilson & Lione

(57) ABSTRACT

An efficient and effective method and system for providing to a customer an audible call notification of a current call and a subsequently received call waiting call. The present embodiments notify the customer that a current call is waiting in an effective manner that reduces confusion. Confusion is reduced by the combination of audible call waiting indicators and audible caller identification information associated with the calling telephone station. Additionally, both the indicator and the representation of the information can be provided automatically without significant delay. The indication is provided even when standard caller identification information is not available by prompting the caller to provide spoken caller identification information. The spoken caller identification information is provided to the called party along with call disposition options, such as options to accept or reject the call, route the call to voice mail or send a sales refusal message.

21 Claims, 5 Drawing Sheets

METHOD AND SYSTEM FOR PROVIDING ENHANCED CALL WAITING AND CALLER IDENTIFICATION

CROSS REFERENCE TO RELATED APPLICATIONS

This patent application is a continuation of application Ser. No. 09/265,001 filed Mar. 9, 1999, now U.S. Pat. No. 6,498,841, which is a continuation-in-part of application Ser. No. 09/122,484, filed Jul. 24, 1998, and a continuation-in-part of application Ser. No. 09/044,574, filed Mar. 19, 1998 now U.S. Pat. No. 6,219,414, all commonly assigned with the present application, which applications are hereby incorporated herein by this reference.

BACKGROUND

The present invention relates generally to telecommunications call processing and more particularly to caller identification and call waiting features.

Telecommunications service providers typically offer services that attempt to provide customers with information that enables them to determine whether or not to accept a call before answering the call. Among these services that provide such information is caller identification ("Caller ID") and Call waiting. Standard Caller ID services generally provide a customer with an indication of who is calling without requiring the customer to answer the call. These systems typically retrieve information about the calling party from a database and provide that information to the called party. Customer premise equipment (CPE) in the form of a display device is generally used to provide the called party with a visual readout of the name and/or telephone number associated with the calling party.

However, the effectiveness of Caller ID systems can be reduced due to a number of different occurrences. One such occurrence is the inability of a service provider to provide the standard Caller ID information for a particular incoming call. This may occur if the Caller ID information is blocked or the call is marked Private by the calling party, or if the Caller ID information is unavailable or incomplete.

Call waiting services generally notify a customer that is busy on a previous call that a current call has been placed to the customer. Call waiting services commonly utilize an audible tone that is transmitted to the customer, to notify the customer that the current call is waiting. When the customer is notified that the current call is waiting, the customer can decide whether or not to suspend the previous call to take the current call. Accordingly, information about the current call aids in the customer's decision.

The effectiveness of Caller ID systems is limited when the called party receives a call waiting call. Some systems are configured to provide Caller ID information to the called party for the call waiting call. However, if the system is unable to provide the information for any of the reasons mentioned above, the called party has no way of identifying the source of the Call Waiting call.

When the standard Caller ID information cannot be provided, the called party is not adequately informed about who is calling and cannot determine whether or not to accept the incoming call before answering the call. For call waiting calls, this becomes particularly important because the called party must interrupt the ongoing call to answer the Call Waiting call. Because the effectiveness of Caller ID systems is greatly reduced when information cannot be provided, an improved system and method are needed for providing caller identification information that overcome these deficiencies.

Patent application Ser. No. 09/122,484, filed Jul. 24, 1998 and commonly assigned to the assignee of the present application, is incorporated herein by reference. This patent application discloses a method and system for providing a called party with audible caller identification information when standard caller identification information cannot be provided. When standard caller identification information cannot be provided, the call is blocked and a request for audible caller identification information is transmitted to the calling party. The audible information is subsequently transmitted to the called party.

This method and system are effective at responding to a first incoming call. However, calls subsequently received when the called party is busy in an ongoing call are either blocked by the current call or may be handled by standard call waiting systems. The standard call waiting system presents standard caller identification information. However, if the standard caller identification information cannot be provided, without placing the current call on hold, the called party has no information on which to base a decision to accept the call waiting call. The called party may wish to reject low priority calls but interrupt the ongoing call to accept higher priority calls. If the standard caller identification information cannot be provided for the call waiting call, the called party cannot effectively respond to the call waiting call.

Patent application Ser. No. 09/044,574, filed Mar. 19, 1998 and commonly assigned to the assignee of the present application, is also incorporated herein by reference. This patent application discloses a method and system for providing an enhanced call waiting message to a called party when the called party is busy on a previous call and receives a current call. The call waiting message includes a call waiting indicator and an audible representation of information associated with the calling party.

This method and system are effective at handling a call waiting call by providing audible information to the called party based on standard caller identification information. However, if standard caller identification information cannot be provided, the called party cannot effectively respond to the call waiting call.

DETAILED DESCRIPTION OF THE PRESENTLY PREFERRED EMBODIMENTS

Figure 1:
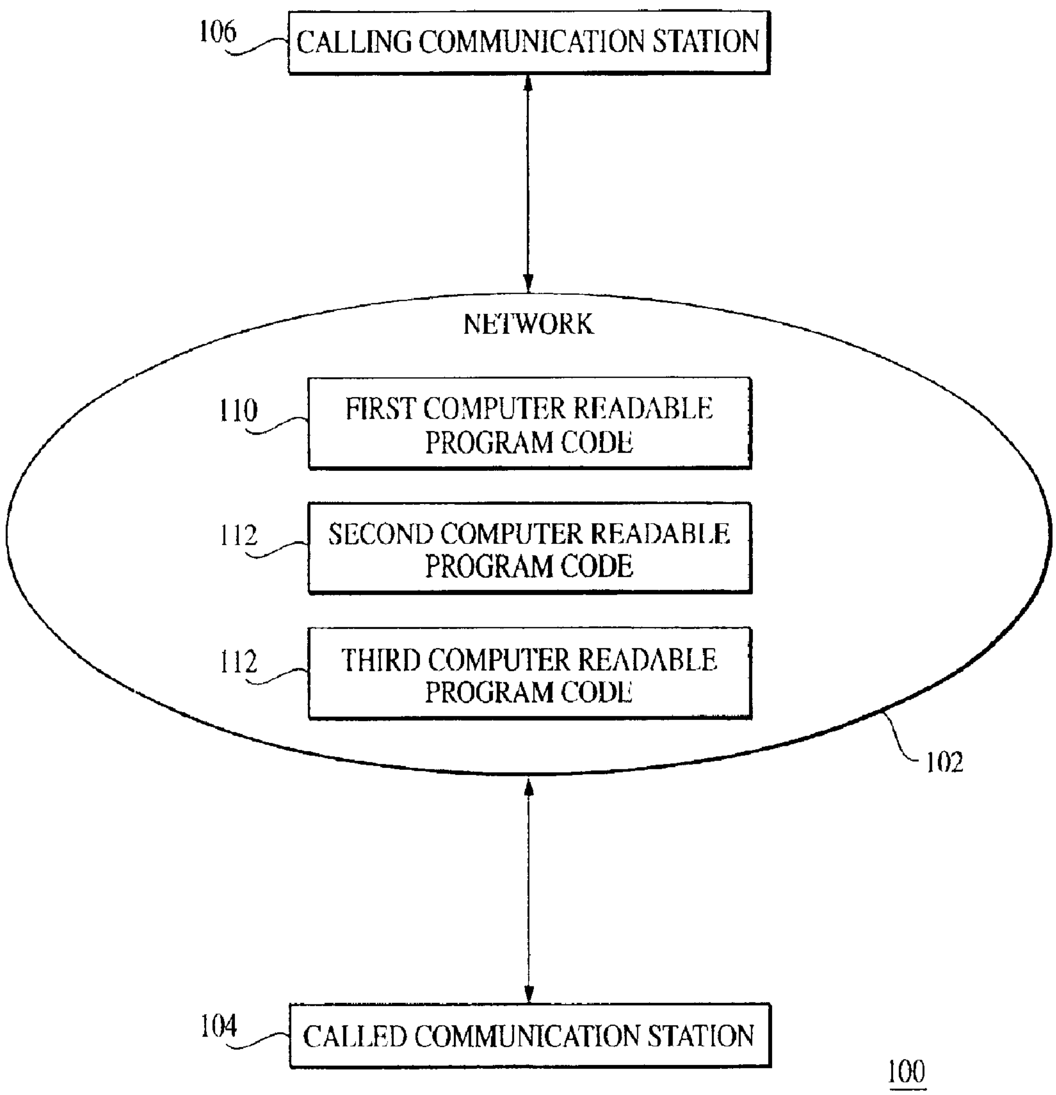
FIG. 1 is a block diagram of a system for processing a telephone call.

By way of example, FIG. 1 depicts a system 100 of a preferred embodiment. The system 100 comprises a network 102, a called communication station 104 connected with the network 102 and a calling communication station 106 connected with the network 102.

The network 102 preferably comprises first computer readable program code 110, second computer readable computer program code 112 and third computer readable program code 114. The first computer readable program code 110 forms a means for determining if the called communication station is off hook or on hook. The second computer readable program code 112 forms a means for transmitting an audible call waiting indicator to the called communication station 104 or for ringing the called communication station 104. The third computer readable program code 114 forms a means for providing to the called communication station audible caller identification information using one of standard caller identification information and spoken caller identification information provided by the calling party at the calling communication station 106. It is important to note that while the program codes 110, 112, 114 have been shown as three separate elements, their functionality can be combined and/or distributed. It is also important to note that "medium" is intended to broadly include any suitable medium including analog or digital, hardware or software, now in use or developed in the future.

The system 100 is preferably implemented in a communications network. Alternatively, the system 100 can be implemented in a computer network or any other network that is adapted to store and retrieve information. In yet another alternative, the system 102 or hardware or software components thereof can be implemented at the subscriber's location, for example, in a personal computer and a home local area network (LAN). The system 100 may include other hardware and software components such as other program codes. Each of the computer readable program codes 110, 112, 114 described above is preferably implemented as code written in any suitable programming language and implemented on an analog or digital computer utilizing any suitable operating system as known by those skilled in the art. Alternatively, each of the computer readable program codes 110, 112, 114 can be implemented through the use of hardware in the form of a hardwired computer, an integrated circuit, or a combination of hardware and computer readable program code as known by those skilled in the art. The calling communication station 106 and the called communication station 104 preferably comprise a telephone station as known by those skilled in the art, including both analog and digital telephone equipment. According to an alternative embodiment, the communication stations 104, 106 can comprise any suitable communication station adapted for use in the present embodiments as known by those skilled in the art.

The system 100 enables a customer at the called communication station 104 to be efficiently and effectively notified that a current call from calling communication station 106 is waiting. The system 100 provides audible notification for all incoming calls, whether the call is a current call or a call waiting call which is received while the current call is still in progress. The system 100 provides an enhanced call message that includes both the call waiting indicator and the audible representation of information associated with the calling communication station 106. In the illustrated embodiment, the audible representation is produced from stored standard caller ID with caller name information. The caller name is processed through a text to speech facility to produce the audible representation. If the standard caller identification information can not be provided, the calling party is prompted by the system to state his name as spoken caller identification information. The spoken caller identification information is then provided as the audible caller identification information. The audible caller identification information associated with the calling communication station alerts the customer that the current call is present or waiting and provides the customer with information that assists the customer in deciding whether to take the current call.

Figure 2:
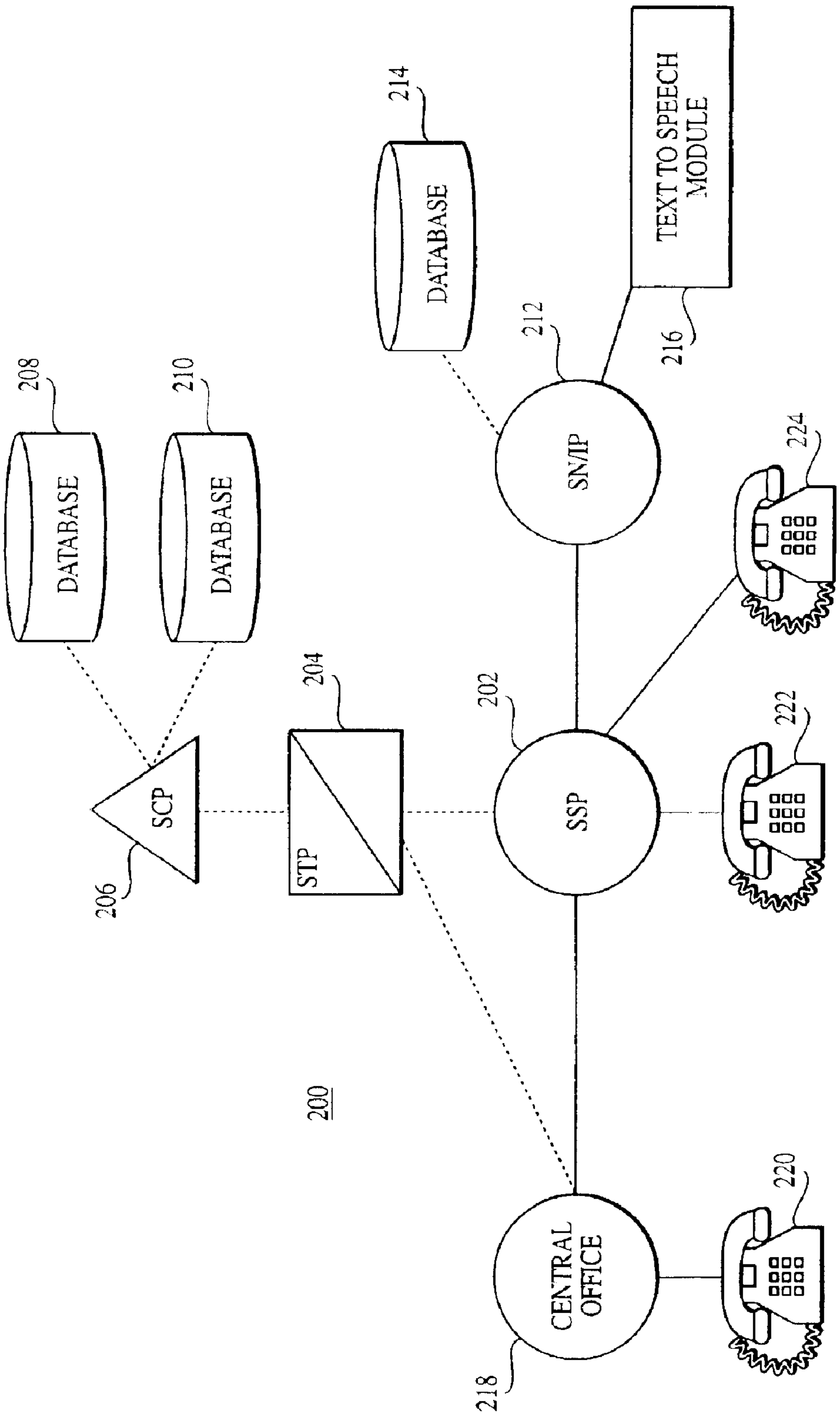
FIG. 2 is a more detailed block diagram of the system depicted in FIG. 1.

By way of further example, FIG. 2 depicts one embodiment of the system 100 described above. Communication system 200 comprises a service switching point (SSP) 202, a signal transfer point (STP) 204, a service control point (SCP) 206, a first SCP database 208, a second SCP database 210, a service node/intelligent peripheral (SN/IP) 212, a SN/IP database 214, a text to speech module 216, a central office 218, calling communication station 220, a called communication station 220 and a third communication station 222. Intelligent network system components, commonly referred to as advanced intelligent network (AIN) components, suitable for implementing the present embodiment are commercially available from several vendors and are known to those skilled in the art. AIN components can implement computer readable program code. Vendors of AIN components typically have a preferred programming language and operating platform.

SSP 202 preferably comprises an AIN switch that routes calls, recognizes and responds to triggers, generates queries to obtain call information and responds to returned call information. SSP 202 connects called communication station 222 with central office 218 to enable a call to be placed between called communication station 222 and calling communication station 220. SSP 202 further connects called communication station 222 with third communication station 224 to complete a call between called communication station 222 and third communication station 224. SSP 202 preferably communicates with SCP 204, central office 218 and SNIP 212 by utilizing a signaling protocol such as Signaling System 7 (SS7) or other such signaling protocols as presently known to those skilled in the art or developed in the future. SSP 202 preferably generates queries to SCP 204 and receives and responds to responses returned from SCP 204.

STP 204 preferably comprises a network element that transfers signaling communications in response to signaling protocols such as SS7 or other such signaling protocols as presently known to those skilled in the art or developed in the future. STP 204 preferably transfers queries from SSP 202 to SCP 206 and transfers responses to the queries from SCP 206 to SSP 202.

SCP 206 preferably comprises an AIN element that stores call information and receives and responds to queries. SCP 206 preferably stores call control information in the first SCP database 208 and can access the stored call control information. SCP 206 also stores standard caller identification information in the second SCP database 210 and can access the stored caller identification information. SCP 206 receives queries generated by SSP 202 and preferably responds to the queries by performing database searches to locate the requested call control information or caller identification information as known to those skilled in the art. SCP 206 can forward the call control information or caller identification information to SSP 202.

SN/IP 212 preferably comprises a network element that enables communications between communication stations 222, 262 and the network. In one embodiment, SN/IP 212 comprises a service node. In another embodiment, SN/IP 212 comprises an intelligent peripheral. Both a service node and an intelligent peripheral are well-known components of an AIN network. In other networks, SN/IP 212 may comprise other components suitable for performing the functions described below.

SN/IP 212 can preferably transmit messages to and receive responses from communication stations 220, 222, 224. SN/IP 212 can generate announcements that can be transmitted to communication stations 220, 222, 224. SN/IP 212 can transmit responses such as audible caller identification information from communication station 220 to communication station 222 by connecting communication stations 220, 222 or by recording and playing back the responses. The announcements transmitted to communication station 222 preferably comprise accept and reject options along with requests for input from the communication station 222. The requests for input preferably comprise requests for input that can be used by SN/IP 212 to cancel calls to communication station 222, connect calls to communication station 222, forward calls to a voice messaging system or another location such as another telephone line, and transmit messages to communication station 220. As used herein, the term voice messaging system means all types of message recording systems as known to those skilled in the art. SN/IP 212 can preferably receive and respond to the input transmitted from communication station 222. The term input means any suitable signal such as DTMF tones, voice input, dial pulse input or modem/fax input as known to those skilled in the art.

Database 208 preferably comprises a data storage element for use with SCP 206. Database 208 preferably stores call control information that can be implemented by SSP 202 to control calls. Such call control information is known to those skilled in the art.

Database 210 and database 214 preferably comprise a standard caller identification with name database as known to those skilled in the art. Databases 210, 214 preferably store information associated with a telephone number that is associated with calling communication station 220. The information associated with the telephone number preferably comprises the identity of a calling party in the form of the calling party's name. Alternatively, the information associated with the telephone number can comprise the identity of a calling party in the form of the calling party's name and the telephone number for calling communication station 220. The telephone number may comprise a 10 digit telephone number but can also comprise any type of identification format used to identify communication stations. Databases 210, 214 can alternatively comprise a caller assistance database as known to those skilled in the art.

Thus, databases 210, 214 form a memory which stores caller identification information and associated name information. The memory may be of any suitable construction or format, such as semiconductor memory, hard disk or otherwise. While databases 208, 210, 214 are depicted within a telecommunications system, databases 208, 210, 214 can comprise any suitable databases containing information adapted for use in the present embodiment and are not limited to databases located within a telecommunications network. It is also important to note that while databases 208, 210, 214 are shown as separate components, they can be implemented as a single database.

Central office 218 preferably comprises an AIN network switch as known to those skilled in the art. Central office 218 enables calls to be placed between calling communication station 220 and called communication station 222. Alternatively, central office 218 can comprise a non-AIN network switch as known to those skilled in the art.

Communication stations 220, 222, 224 preferably comprise analog telephone sets as known to those skilled in the art. Alternatively, communication stations 220, 222, 224 can comprise cellular, wireless, personal communication service (PCS), ISDN or any other form of communication station known to those skilled in the art. Called communication station 222 preferably includes CPE equipment for use with caller identification services as known to those skilled in the art.

Figure 3:
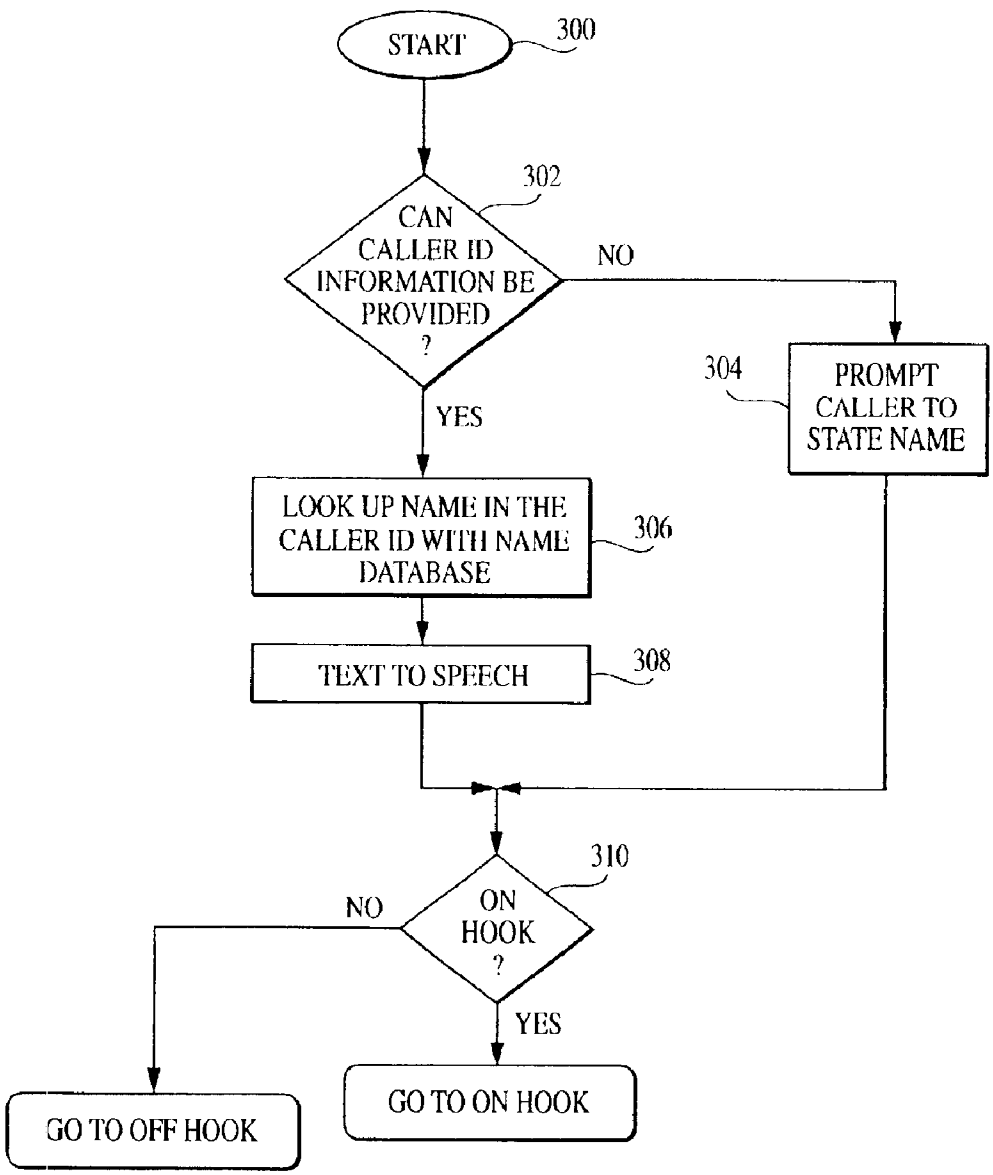
FIGS. 3–5 are a flow chart illustrating a method for processing a telephone call.
Figure 4:
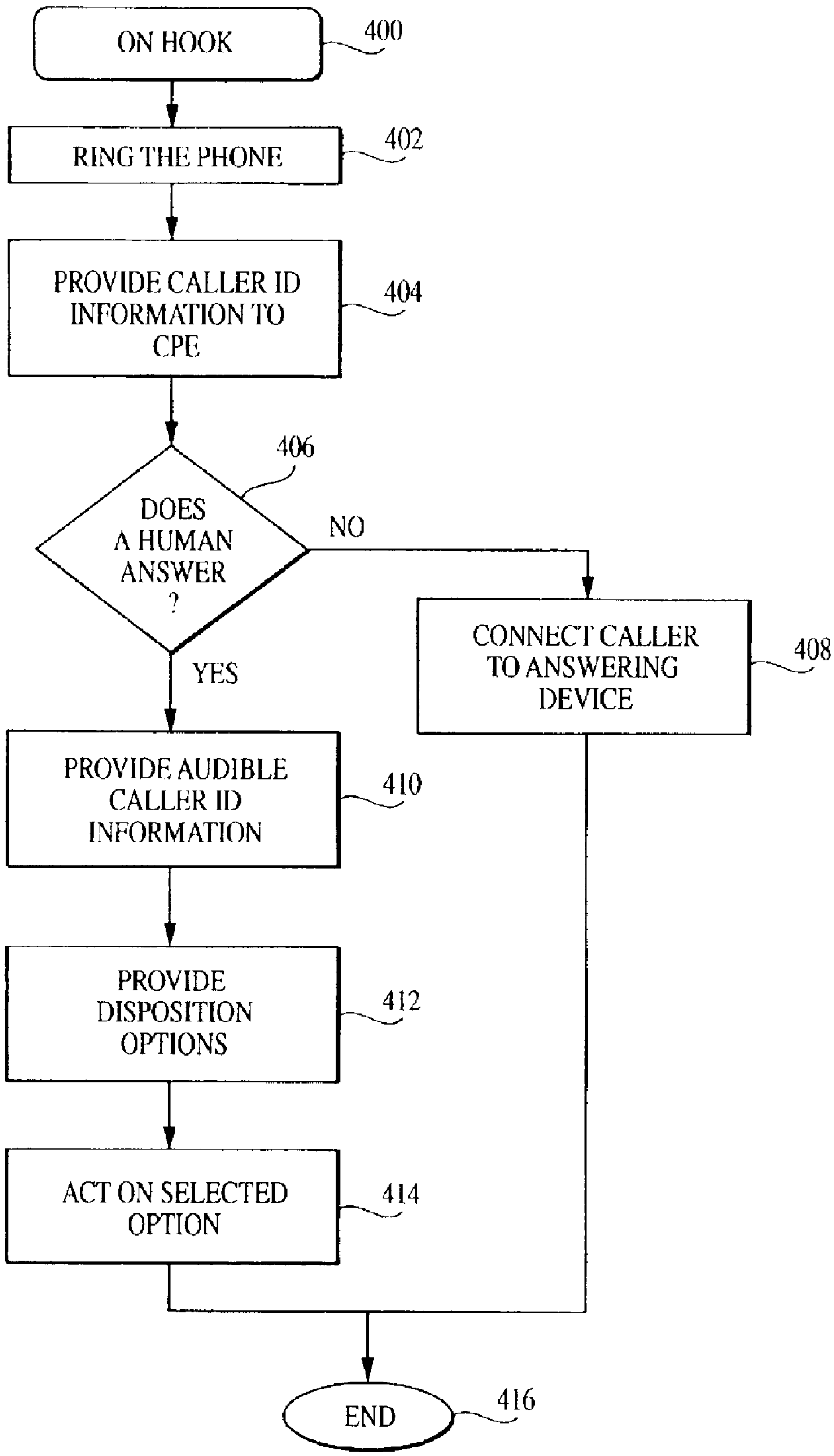
Figure 5:
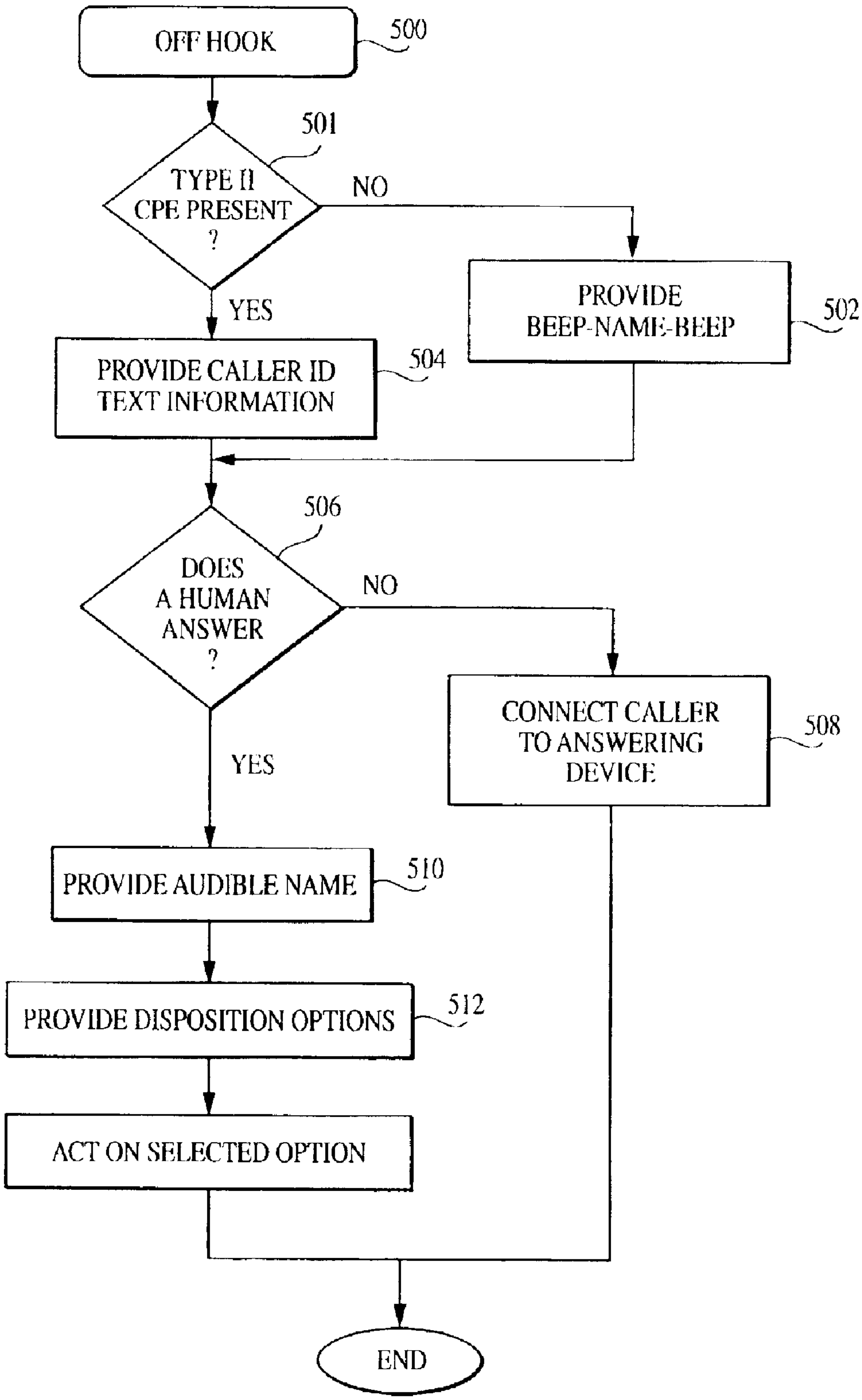

The system 200 depicted in FIGS. 1 and 2 can be utilized to implement the method depicted in FIGS. 3 through 5. For purposes of illustration, assume that a customer at called communication station 222 (FIG. 2) is on a previous call with a previous calling party at third communication station 224. Connections are established between called communication station 222 and SSP 202 and between SSP 202 and third communication station 224 to enable the previous call to be connected. Also, assume that after the previous call has been commenced, a calling party at calling communication station 220 places a current call to the customer at called communication station 222. In an attempt to connect the current call, central office 218 routes the current call to SSP 202.

The method of processing a current call from a calling telephone station 220 (FIG. 2) to a called telephone station 222 begins at step 300. At step 302, it is determined if standard caller identification information can be provided for the called communication station 222.

In this embodiment, when the call is routed to SSP 202, a terminating attempt trigger is activated when SSP 202 attempts to connect the call to called telephone station 222. The trigger generates a query that is sent to SCP 206. The query preferably includes a calling party identification parameter which can include a calling party presentation restriction indicator and requests the return of standard caller identification information. The telephone number associated with the calling telephone station 220 is included in the calling party identification parameter of the query. SCP 206 receives the query and determines whether or not the called party at called telephone station 222 subscribes to the present service. In response to a determination that the called party subscribes to the present service, SCP 206 analyzes the information included with the query to determine whether standard caller identification information can be provided to called telephone station 222.

Determining whether standard caller identification information can be provided in one embodiment comprises the following steps. The SCP 206 first determines whether standard caller identification information is unavailable. The SCP 206 determines whether the standard Caller ID information is unavailable by determining whether or not the calling party identification parameter is present in the query. In addition, the SCP 206 determines whether the standard caller identification information is incomplete. The SCP 206 preferably determines whether the standard caller identification information is incomplete by determining whether or not the calling party identification parameter is a valid telephone number. In addition, the SCP 206 determines whether the standard caller identification information has been blocked. The SCP 206 determines whether the standard caller identification information has been blocked by determining whether or not the calling party identification presentation restriction indicator is set to "presentation restricted."

If the standard caller identification information cannot be provided, at step 304 the calling party is prompted to audibly provide spoken caller identification information. SCP 206 accesses database 208 to retrieve call control information and returns the call control information to SSP 202. The call control information can be sent to SSP 202 in response to a lead directory number that uniquely identifies each SSP in the system 200. In response to the call control information, SSP 202 routes the call to SN/IP 212. When SN/IP 212 receives the call, SN/IP 212 generates a request for spoken caller identification information that is transmitted to the calling telephone station 220. The request preferably comprises a statement indicating that the called party doesn't accept calls from unidentified callers and a request for the calling party to speak his/her name and/or the name of the company that they represent. The request preferably comprises an audible message. Alternatively, the request can be displayed on CPE equipment as known to those skilled in the art. If the calling party provides an audible response, SN 250 or IP 290 enables the audible response to be transmitted to called telephone station 222 as audible caller identification information. The audible response may be stored as audible caller identification information, for example at database 214. Alternatively, if the calling party does not provide the requested information, the call is canceled. After prompting for and storing the spoken caller identification information, control proceeds to step 310.

At step 302, if standard caller identification information can be provided for the calling communication station, at step 306 the SN/IP 212 looks up the calling party's name in the caller identification with name database. This database is stored, for example, at database 214. The system obtains information associated with the calling communication station.

Obtaining information associated with the calling communication station comprises the following steps. In an AIN implementation, when SSP 202 determines that the customer at called communication station 222 is busy on a previous call, SSP 202 generates a query to SCP 206. In response to the query, SCP 206 provides call control information from a database such as SCP database 208. In a non-AIN environment, a central office associated with the called communication station forwards the call in accordance with a call forward on busy feature, or other similar function. Call forward on busy features and other similar functions are well known by those skilled in the art. The call control information instructs SSP 202 where to route the current call when called communication station 222 is busy. After receiving the query from SSP 202, SCP 206 identifies the relevant call control information and forwards it to SSP 202. The relevant call control information has been created to enable SSP 202 to forward the current call to SN/IP 212 when called telephone station 222 is busy. In accordance with the call control information, SSP 202 routes the current call to SN/IP 212. SN/IP 212 examines the telephone number associated with calling communication station 220 and identifies information corresponding to the telephone number by performing a database search of the database 214, for example. The information corresponding to the telephone number preferably comprises name data indicating the identity of the current caller at calling communication station 220 in the form of the name of the current caller. Database 214 preferably comprises a caller identification with name database as known by those skilled in the art. Alternatively, the database 214 can comprise a caller assistance database as known by those skilled in the art. Thus, when the standard caller identification information can be provided, the system retrieves from a database the standard caller identification information, including name data for the calling party.

At step 308, audible caller identification information is produced in response to the name data for the calling party. In the illustrated embodiment of FIG. 2, SN/IP 212 implements the text to speech module 216 to generate an audible representation of the name associated with calling communication station 220. Control then proceeds to step 310.

At step 310, the system determines if the called communication station 222 is on hook or off hook. The called communication station will be off hook if it is busy on a previous call, for example with third communication station 224. The step of determining whether the called communication station 222 is busy on a previous call in one embodiment comprises the following steps. SSP 202 receives the current call and attempts to terminate the call to called communication station 222. Because the customer at called telephone station 222 is busy on a previous call, the current call cannot be terminated to called telephone station 222 and SSP 202 determines that the customer at called telephone station 222 is busy on a previous call.

If the called communication station is on hook, control proceeds to step 400, FIG. 4. If the called communication station is off hook, control proceeds to step 500, FIG. 5.

FIG. 4 illustrates call processing in the case of the called communication station 222 being on hook. At step 402, the system rings the called communication station 222. At step 404, the system provides available caller identification information to the CPE. This may be standard caller identification information if that can be provided. This may be indications that the standard caller identification information cannot be provided, such as an indication that the standard caller identification information is unavailable or unknown. In one embodiment, the trade name of the service provider's service is provided to indicate to the called party that the service is processing the call.

At step 406 in the illustrated embodiment, the system determines if the called communication station 222 is being answered by a human. In this manner, the present systems and methods can be configured to work in conjunction with fax machines, answering machines and voice messaging systems. After the called party answers the telephone, a message is transmitted to the called communication station 222 requesting the called party to provide appropriate input to signify that the call is being answered by a human. The message preferably comprises an audible message and is preferably transmitted to the called telephone station 222 by the SN/IP 212. The input can comprise any suitable signal such as DTMF tones, dial pulse input, modem/fax input or voice input as known to those skilled in the art. If the called party provides the requisite input, the audible caller identification information provided by the calling party can be transmitted to the called party. However, if input is not provided within a predetermined amount of time, the audible caller identification information is not transmitted to the called party. Instead, step 408, the calling party can be connected with the answering machine or the voice mail system and the calling party can leave a conventional message. The preferred time period within which the input must be received to prevent the calling party from being connected with the answering machine or voice mail system is three seconds.

Alternatively, if an answering machine or a voice mail system answers the call, the answering machine or voice mail system can immediately transmit a tone input to the SN/IP 212 to signify that the call is not being answered by a human. In response to the input, the SN/IP 212 can connect the calling party to the answering machine or the voice mail system and the calling party can leave a conventional message, step 408. Control proceeds to step 416 where the method for processing the call ends.

If, at step 406, a human answers, at step 410 the audible caller identification information is provided to the called communication station 222. The audible caller identification information may be either the spoken caller identification information that was provided by the calling party or the audible caller identification information produced by the text to speech module 216 converting the standard caller identification information. Alternatively, the calling telephone station 220 and the called telephone station 222 can be connected such that the audible caller identification information can be transmitted between the telephone stations 220, 222. The system provides to the called communication station 222 audible caller identification information using one of standard caller identification information and spoken caller identification information provided by the calling party.

At step 412, after the audible caller identification information has been transmitted, a message is transmitted to called telephone station 222. The message provides disposition options for the call to the called party. The message preferably includes instructions that allow the called party to accept or reject the call by providing the appropriate input. The message preferably comprises audible instructions that are transmitted by SN/IP 212 to called telephone station 222. For example, the called party may be prompted to press 1 on a keypad of the telephone to accept the call waiting call, in which case the calling communication station is connected to the called communication station. The called party may be prompted to press 2 to deny the call waiting call, in which case the calling party hears only ringing. This is advantageous because the calling party will have no indication that the incoming call was rejected, only an indication that no one was available to answer the call. The called party may be prompted to press 3 to route the call to voice mail, in which case a voice mail greeting is played to the calling party, who is given the option to leave a message for the called party. The called party may be prompted to press 4 to send a sales refusal, in which case the system plays an announcement rejecting the call and requesting no further calls. The called party may alternatively be prompted to press 5 to block the caller, in which case the calling communication station is blocked from ringing the called communication station in the future. Other call disposition options may be provided to suit the needs of particular subscribers, such as residential and business subscribers.

At step 414, in response to input provided by the called party, the SN/IP 212 can process the call. Accordingly, the SN/212 can connect the call, cancel the call, transmit a message to the calling telephone station 220 or forward the call to a voice messaging system or another location in response to the input provided by the calling party. The method for processing the call ends at step 416.

FIG. 5 illustrates call processing in the case of the called communication station 222 being off hook. In this instance, the called communication station 222 is engaged in a previous call with another communication station, such as third communication station 224.

At step 501, the system determines if Type II capable CPE equipment is present at the off-hook extension of the subscriber line. Type II CPE operates in conjunction with the communication system according to an established industry standard to provide caller identification information when a called telephone is off hook. Other standards, referred to as Type 2.5 and Type III, are also Type II-capable while providing additional functions. If Type II capable CPE is not present, at step 502, audible call waiting information is provided to the called communication station 222. According to one embodiment, SSP 202 generates the call waiting information comprising a tone or other similar indicator that is transmitted to called telephone station 222 to signify the start of the call waiting message. The call path of the previous call is temporarily interrupted to place the previous call on hold. If standard caller identification information was available, the SN/IP 212 automatically transmits an audible representation of the name associated with a caller at calling communication station 220 to the called communication station 222. SN/IP 212 implements the text to speech module 216 to generate an audible representation of the name associated with calling communication station 220. The audible representation of the name is transmitted as audible caller identification information to called telephone station 222. If standard caller identification information could not be provided, SSP 202 retrieves from SN/IP 212 the stored spoken caller identification information provided by the calling party when prompted (step 304, FIG. 3). In that case, the spoken caller identification is transmitted as audible caller identification information to called telephone station 222.

The audible caller identification information is transmitted within a predetermined amount of time after the call waiting indicator is transmitted. The previous call is restored after the name has been transmitted to called telephone station 222. SSP 202 preferably generates a second call waiting indicator comprising a tone or other similar indicator that is sent to called telephone station 222. The second call waiting indicator is preferably transmitted to called telephone station 222 within a predetermined amount of time after the name is transmitted. The effect is to produce a call waiting message having a beep-name-beep format, in which the name is the audible caller identification information. According to an alternative embodiment, the steps of transmitting a call waiting indicator comprise transmitting a plurality of tones to called telephone station 222. According to a further alternative embodiment, the call waiting indicators are generated by SN/IP 212 and transmitted to called telephone station 222. In the case where no Type II capable CPE equipment, then, the system provides audible caller identification information including an audible representation of the calling party's name. Control then proceeds to step 506.

If, at step 501, the system determined that Type II capable CPE is present at the busy extension of the subscriber line, at step 504 caller identification data is provided to the called communication station 222. The call path of the previous call is temporarily interrupted to place the previous call on hold. The standard caller identification data are provided to the CPE for display of the caller identification as text data. In the preferred embodiment, an audible call waiting indicator such as a beep is played to the called party to signify the waiting call. In response to this indicator, the called party can then examine the display associated with the in-use extension to read the text data. Control proceeds to step 506.

At step 506, the system determines if a human answers the call. The called communication station 222 may be engaged on a previous call which is being handled by an answering machine, a voice messaging system or a fax machine. As described above in connection with step 406 (FIG. 4), a message is transmitted to the called communication station 222 requesting the called party to provide appropriate input to signify that the call is being answered by a human. If no appropriate input is received, the calling party may be connected to a voice mail system or other answering device to leave a message, step 508, or processed in other similar fashion. Processing of the call then ends at step 516. If appropriate input is received at step 506, processing continues at step 508.

At step 510, audible caller identification information is provided to the called communication station 222. If standard caller identification information was available, the SN/IP 212 automatically transmits an audible representation of the name associated with a caller at calling communication station 220 to the called communication station 222. SN/IP 212 implements the text to speech module 216 to generate an audible representation of the name associated with calling communication station 220. The audible representation of the name is transmitted as audible caller identification information to called telephone station 222. If standard caller identification information could not be provided, SSP 202 retrieves from SN/IP 212 the stored spoken caller identification information provided by the calling party when prompted (step 304, FIG. 3). In that case, the spoken caller identification is transmitted as audible caller identification information to called telephone station 222.

At step 512, the system transmits one or more disposition options to the called party. In one embodiment, an audible message is played to the called party to present the disposition options. For example, the called party may be prompted to press 1 on a keypad of the telephone to accept the call waiting call, in which case the calling communication station is connected to the called communication station. The called party may be prompted to press 2 to deny the call waiting call, in which case the calling party hears only ringing. This is advantageous because the calling party will have no indication that the incoming call was rejected, only an indication that no one was available to answer the call. The called party may be prompted to press 3 to route the call to voice mail, in which case a voice mail greeting is played to the calling party, who is given the option to leave a message for the called party. The called party may be prompted to press 4 to send a sales refusal message, in which case the system plays an announcement rejecting the call and requesting no further calls. The called party may alternatively be prompted to press 5 to block the caller, in which case the calling communication station is blocked from ringing the called communication station in the future. Other call disposition options may be provided to suit the needs of particular subscribers, such as residential and business subscribers.

The present embodiments provide an efficient and effective method and system for providing to a customer an audible call waiting notification of a current call. The notification is provided for all calls, including a first-received call and a subsequently-received call waiting call. The present embodiments notify the customer that a current call is waiting in an effective manner that reduces confusion. Confusion is reduced by the combination of audible call waiting indicators and audible caller identification information associated with the calling telephone station. Additionally, both the indicator and the representation of the information can be provided automatically without significant delay. The indication is provided even when standard caller identification information is not available by prompting the caller to provide spoken caller identification information.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

We claim

1. A method for processing a call from a calling party at a calling communication station to a called party at a called communication station in a communications system, the method comprising:

receiving a terminating attempt query including a calling party identifier and a calling party restriction indicator associated with the call at a Service Control Point (SCP) of the communications system;

at the SCP, in response to the terminating attempt query, determining whether standard caller identification can be provided for the call, including at least one of determining if standard caller identification for the call is complete, and determining if a presentation restriction indicator for the call is set to presentation restricted;

if standard caller identification can not be provided for the call, initiating a prompt to the calling party to provide spoken caller identification information;

storing the spoken caller identification information;

determining if the called communication station is off hook;

if the called communication station is off hook, providing audible call waiting information including one of the stored spoken caller identification information and an audible representation of name data associated with the calling communication station;

if the called communication station is on hook, ringing the called communication station; and providing available caller identification information to the called communication station.

2. The method of claim 1 wherein providing audible call waiting information comprises:

retrieving the name data from a caller identification with name database; and processing the name data in a text to speech module to produce the audible representation.

3. The method of claim 1 wherein providing audible call waiting information comprises:

processing the standard caller identification in a text to speech module to produce the audible representation.

4. The method of claim 1 wherein providing available caller identification information comprises:

providing standard caller identification information if the standard caller identification can be provided for the call, otherwise providing audible caller identification information including the stored spoken caller identification information.

5. The method of claim 1 wherein providing available caller identification information comprises providing an indication that the standard caller identification can not be provided.

6. The method of claim 1 wherein providing audible call waiting information comprises:

providing a trade name of a service provider's call processing service.

7. The method of claim 1 further comprising:

receiving the call from a calling communication station routing the call to a Service Switching Point (SSP) of the communications system;

at the SSP, generating the terminating attempt query; and communicating the terminating attempt query to a Service Control Point (SCP).

8. The method of claim 1 wherein prompting the caller to provide audible caller identification information comprises:

at the SCP, producing call control information;

conveying the call control information to the SSP; and at the SSP, in response to the call control information, activating a service node/intelligent peripheral (SN/IP) to generate a prompt to the calling communication station.

9. The method of claim 1 wherein providing the audible call waiting information comprises:

at the SSP, retrieving from the SN/IP the recorded spoken caller identification information; and transmitting the recorded spoken caller identification information to the called communication station.

10. The method of claim 1 further comprising the steps of:

providing to the called party call disposition options for the call;

detecting a selected disposition option; and processing the call according to the selected call disposition option.

11. The method of claim 10 wherein providing call disposition options comprises offering an option to suspend a current call between the called communication station and a third communication station while completing the call between the calling communication station and the called communication station.

12. The method of claim 1 further comprising the steps of:

determining if a human answers the call at the called communication station;

if a human does not answer the call, routing the call to a voice messaging system.

13. A method for processing a call from a calling party to a called party in a Service Control Point (SCP) of a communications system, the method comprising:

receiving a terminating attempt query including a calling party identifier and a calling party restriction indicator associated with the call at the SCP;

in response to the terminating attempt query, determining whether standard caller identification can be provided for the call, including at least one of determining if standard caller identification for the call is complete, and determining if a presentation restriction indicator for the call is set to presentation restricted;

if standard caller identification can not be provided for the call, at the SCP producing call control information for controlling a Service Switching Point (SSP) and a service node/intelligent peripheral (SN/IP);

conveying the call control information;

activating the SN/IP to generate a prompt to the calling communication station, prompting the calling party to provide spoken caller identification information, and store the spoken caller identification information;

determine if the called communication station is off hook;

if the called communication station is off hook, provide audible call waiting information including the stored spoken caller identification information; and if the called communication station is on hook, provide the audible call waiting information including the stored spoken caller identification information.

14. A communication system configured to process a call from a calling party at a calling communication station to a called party at a called communication station, the communication system comprising:

a service control point operative to determine at least one of whether standard caller identification for the call is complete, and whether a presentation restriction indicator for the call is set to presentation restricted; and system equipment in communication with the service control point, the system equipment being configured to prompt the calling party to provide spoken caller identification information;

store the spoken caller identification information;

determine if the called communication station is off hook; and if the called communication station is off hook, provide audible call waiting information including one of the stored spoken caller identification information and an audible representation of name data associated with the calling communication station;

if the called communication station is on hook, ring the called communication station and provide available caller identification information to the called communication station.

15. The communication system of claim 14 wherein the system equipment comprises a service node in data communication with the service control point and the called communication station.

16. The communication system of claim 14 wherein the system equipment comprises an intelligent peripheral in data communication with the service control point and the called communication station.

17. The communication system of claim 14 wherein the system equipment comprises a service switching point (SSP) and an intelligent peripheral in communication with the SSP and the called communication station.

18. The communication system of claim 14 further comprising a memory which stores caller identification information and associated name information.

19. The communication system of claim 18 wherein the system equipment is operative to retrieve from the memory the associated name information in response to the standard caller identification information.

20. A caller identification method for a telecommunication system, the method comprising:

processing a call from a calling party at a calling communication station to a called party at a called communication station;

determining if standard caller identification information for the call can be provided to the called communication station;

if standard caller identification information for the call can not be provided, prompting the calling party for spoken caller identification information and recording the spoken caller identification information;

if the called communication station is off hook, determining if Type II capable caller premises equipment (CPE) is present at the called communication station;

if Type II capable CPE is present, providing to the called communication an audible call waiting indicator and a text to speech representation of the standard caller identification information if the standard caller identification information can be provided, or the recorded spoken caller identification information.

21. The method of claim 20 further comprising:

providing to the called communication station a beep-name-beep signaling pattern, wherein the beeps correspond to the audible call waiting indicator and the name corresponds to either the text to speech representation of the standard caller identification information or the recorded spoken caller identification information.

* * * * *